United States Patent Office 3,420,890
Patented Jan. 7, 1969

3,420,890
PROPANE DITHIOLS
Bernard J. Ludwig, North Brunswick, N.J., Julius Diamond, Plymouth Meeting, Pa., and Wilfred A. Skinner, Jr., Portola Valley, Calif., assignors to Carter-Wallace, Inc., a corporation of Maryland
No Drawing. Original application Apr. 29, 1963, Ser. No. 276,197, now Patent No. 3,264,338, dated Aug. 2, 1966. Divided and this application Feb. 16, 1966, Ser. No. 527,742
U.S. Cl. 260—609    7 Claims
Int. Cl. C07c *149/18*

This invention relates to a new class of compounds which are 2-substituted-1,3-propanedithiols and 2-substituted-3-hydroxypropylthiols and to methods for preparing them.

The present application is a divisional application of U.S. Ser. No. 276,197, filed Apr. 29, 1963, now U.S. Patent No. 3,264,338, issued Aug. 2, 1966.

The thiol compounds of the present invention have the following general structure:

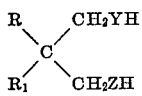

wherein R and $R_1$ represent hydrogen or hydrocarbon radicals selected from the group consisting of lower alkyl and phenyl, with at least one of said groups being a hydrocarbon radical, and Y and Z represent oxygen or sulfur, with at least one of said groups being sulfur.

The preferred compounds are those where R and $R_1$ are lower alkyl or aryl.

The dithiol compounds of this invention are obtained by (1) reacting an appropriate 2-substituted-1,3-propanediol (I) with an aromatic sulfonyl halide, e.g. p-toluene sulfonyl chloride to give an aromatic sulfonate ester (II), (2) reacting said aromatic sulfonate ester with an alkali metal thiolacetate in a dimethylformamide solvent to give a thiolacetate ester (III), and (3) hydrolyzing said thiolacetate ester to its corresponding dithiol (IV).

The above reactions are as follows, where R and $R_1$ are hydrogen or hydrocarbon radicals, Ar is an aromatic radical and X is a halogen atom.

(1)
$$RR_1C(CH_2OH)_2 + 2ArSO_2X \longrightarrow RR_1C(CH_2OSO_2Ar)_2 + 2HX$$
$$\quad\quad\quad\quad\quad\text{I} \quad\quad\quad\quad\quad\quad\quad\quad\quad\quad\quad\text{II}$$

(2)
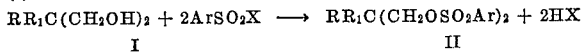
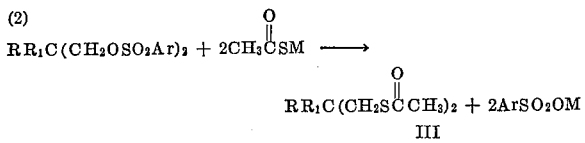

(3)
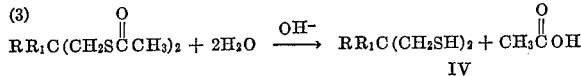

The monothiol compounds of this invention are obtained by a similar series of reactions, except that in Step 1 only one mode of aromatic sulfonyl halide is employed for each mole of 2-substituted-1,3-propanediol. The sequence of reactions is as follows:

(1a)
$$RR_1C(CH_2OH)_2 + ArSO_2X \longrightarrow$$
$$\quad\quad\quad\quad RR_1C(CH_2OH)(CH_2OSO_2Ar) + HX$$

(2a)
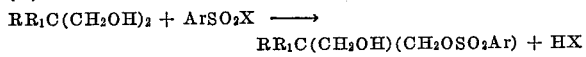
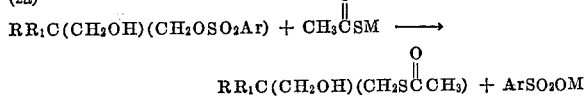

(3a)
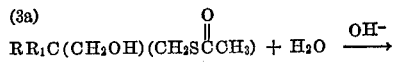
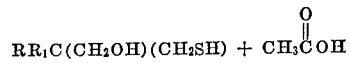

The method for preparing the above-mentioned mono and dithiols is a novel method; this method being the Steps 2 and 3, or 2a and 3a, described hereinbefore. Referring to Step 2, or 2a, it should be understood that the thiolacetate ester that is formed is not isolated but hydrolyzed to its corresponding thiol in accordance with Step 3, or 3a.

More particularly, the above-mentioned method for producing thiol compounds may be described as follows:
A thiol compound having the structure

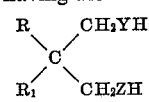

where R and $R_1$ represent hydrogen and hydrocarbon radicals with at least one of said groups being a hydrocarbon radical, and Y and Z represent oxygen and sulfur with at least one of said groups being sulfur, is prepared by reacting an aromatic sulfonate ester having the formula:

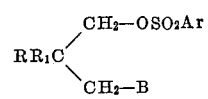

where R and $R_1$ are the radicals defined above, B is a radical selected from the group consisting of —OH and —OSO₂Ar, and Ar is an aromatic radical, with an appropriate amount of an alkali metal thiolacetate having the formula

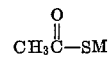

where M is an alkali metal atom, in dimethylformamide solvent to give a thiolacetate ester having the formula

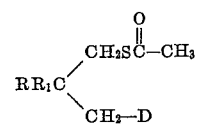

where D is selected from the group consisting of —OH and

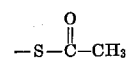

radicals, and hydrolyzing said thiolacetate ester to its corresponding thiol.

With respect to the above-described process for the production of thiols, it has been found that the use of dimethylformamide as a solvent permits the preparation of many thiol compounds that is not possible if ordinary organic solvents such as ether, ethanol and acetone are employed.

In order to illustrate the invention more specifically, the following examples are given. Examples A and B represent the preparation of 2-substituted-1,3-propanedithiols and 2-substituted-3-hydroxypropylthiols.

Example A

The following is a description of the preparation of 2-methyl-2-propyl-1,3-propanedithiol:

p-Toluenesulfonyl chloride (191 g., 1 mole) was added portion-wise with stirring to a solution of 66 g. (0.5 mole) of 2-methyl-2-propyl-1,3-propanediol in 600 ml. of pyridine. The temperature was maintained at 18–20°. After standing overnight, the mixture was poured into a solution of 1850 ml. methanol, 980 ml. of water and 730 ml. concentrated hydrochloric acid. The mixture was refrigerated overnight and the white crystalline product which separated was filtered off. The product was 2-methyl-2-propyl-1,3-propanediol ditosylate. Yield 160 g. A sample recrystallized from ethanol melted at 67–69°.

*Analysis.*—Calcd. for $C_{21}H_{28}O_6S_2$: S, 14.56. Found: S, 14.85.

A mixture of 48 g. (0.111 mole) of 2-methyl-2-propyl-1,3-propanediol ditosylate and 38 g. (0.333 mole) of dry potassium thiolacetate in 300 ml. of dimethylformamide was heated at its reflux temperature for 18 hours. The cooled mixture was poured into 500 ml. of water, extracted with ether, the ether extract washed with water and dried over anhydrous sodium sulfate. The filtered extract was distilled giving 11 g. (40%) of 2-methyl-2-propyl - 1,3 - propanedithiol, B.P. 54–56°/0.1 mm., $n_D{}^{26}$ 1.5107, $d_4{}^{20}$ 0.993.

*Analysis.*—Calcd. for $C_7H_{16}S_2$: C, 51.1; H, 9.8; S, 39.0. Found: C, 51.3; H, 9.7; S, 39.2.

Also prepared in the above-mentioned manner from the appropriate substituted 1,3-propanedithiol were the following: 2-methyl-2-sec.-butyl-1,3-propanedithiol, B.P. 67–74°/0.1 mm., $n_D{}^{26}$ 1.5145; 2-ethyl-1,3-propanedithiol, B.P. 84–86°/15 mm. and 2-ethyl-2-phenyl-1,3-propanedithiol, B.P. 83–85°/0.05, $n_D{}^{26}$ 1.5840.

In the above-described example, as well as throughout this disclosure unless otherwise indicated, reference to temperature degrees means centigrade.

Example B

The following is a description of the preparation of 2-methyl-2-propyl-3-hydroxypropylthiol.

To a solution of 13.2 g. (0.1 mole) of 2-methyl-2-propyl-1,3-propanediol, 7.9 g. (0.1 mole) pyridine and 25 ml. of anhydrous ether cooled to 50° C. was added 19.0 g. (0.1 mole) of p-toluenesulfonyl chloride. The clear solution was maintained at 0° C. for 16 hours. The white precipitate of pyridine hydrochloride was filtered and the ether solution washed with 5% aqueous hydrochloric acid and with water and dried over anhydrous sodium sulfate. The solution was concentrated in vacuo, dissolved in the minimum amount of light petroleum ether and chromatographed on an alumina column. Elution of the column with ether yielded 2-methyl-2-propyl-3-hydroxypropyl tosylate in 58% yield (16.6 g.) as a colorless oil; $n_D{}^{25}$ 1.5107.

*Analysis.*—Calcd. for $C_{14}H_{22}O_4S$: C, 58.7; H, 7.75; S, 11.2. Found: C, 59.0; H, 7.89; S, 11.4.

A mixture of 14.4 g. (0.0505 mole) of the monotosylate and 11.4 g. of anhydrous potassium thiolacetate (prepared by titration of distilled thiolacetic acid with 3 N potassium hydroxide in methanol) in 60 ml. of dimethylformamide was heated at 95–100° C. under nitrogen with stirring for 2 hours. After standing overnight at room temperature under nitrogen, ether was added to the mixture, and the salts filtered. The ether was removed in vacuo, yielding 7.8 g. (81%) of the crude thiolester. The thiolester was hydrolyzed with 3.8 g. of sodium hydroxide, 25 ml. of water, and 60 ml. of ethanol by stirring for 3 hours in a stoppered flask. The clear, yellow solution was chilled, acidified with 6 N hydrochloric acid and ether extracted. The extracts were washed with water, dried over anhydrous magnesium sulfate, and 4.7 g. of product, 2-methyl-2-propyl - 3 - hydroxypropylthiol, were obtained by distillation under reduced pressure, B.P. 76–80° C./0.5–0.6 mm., $n_D{}^{26}$ 1.4875.

*Analysis.*—Calcd. for $C_7H_{16}OS$: C, 56.7; H, 10.9; S, 21.6. Found: C, 56.9; H, 10.9; S, 21.4.

Also prepared in this manner from the appropriate 2-substituted-1,3-propanediol was 2-methyl-2-sec.-butyl-3-hydroxypropylthiol, B.P. 65–66°/0.06 mm.

The novel thiol compounds of this invention can be reacted with cyanic acid as disclosed in parent application U.S. Ser. No. 276,197 to produce valuable carbamate derivatives possessing anticonvulsant and muscle relaxant properties.

The invention in its broader aspects is not limited to the specific steps, methods and compositions described but departures may be made therefrom within the scope of the accompanying claims without departing from the principles of the invention and without sacrificing its chief advantages.

What is claimed is:
1. Thiol compounds of the formula

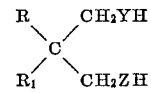

wherein R and $R_1$ represent hydrogen or hydrocarbon radicals selected from the group consisting of lower alkyl and phenyl, with at least one of said groups being a hydrocarbon radical, and Y and Z represent oxygen or sulfur, with at least one of said groups being sulfur.

2. 2-methyl-2-propyl-1,3-propanedithiol.
3. 2-methyl-2-sec-butyl-1,3-propanedithiol.
4. 2-ethyl-1,3-propanedithiol.
5. 2-ethyl-2-phenyl-1,3-propanedithiol.
6. 2-methyl-2-propyl-3-hydroxypropylthiol.
7. 2-methyl-2-sec-butyl-3-hydroxypropylthiol.

References Cited

Reid: "Chem. Biult. Sul." vol. 1, p. 19 (1958).

CHARLES B. PARKER, *Primary Examiner.*

D. R. PHILLIPS, *Assistant Examiner.*

U.S. Cl. X.R.

260—456, 455